United States Patent
Poole et al.

(10) Patent No.: US 7,063,739 B2
(45) Date of Patent: *Jun. 20, 2006

(54) LIQUID COMPOSITION ADDITIVE TO REDUCE DRYING TIME OF SURFACE COATINGS

(76) Inventors: Rick Poole, 3404 Ridge Smoke, San Antonio, TX (US) 78247; Mark Lane, 14900 Nacogdochea Rd., San Antonio, TX (US) 78248

(*) Notice: Subject to any disclaimer, the term of this patent is extended or adjusted under 35 U.S.C. 154(b) by 16 days.

This patent is subject to a terminal disclaimer.

(21) Appl. No.: 10/829,759

(22) Filed: Apr. 22, 2004

(65) Prior Publication Data

US 2005/0235879 A1 Oct. 27, 2005

(51) Int. Cl.
*C04B 14/00* (2006.01)

(52) U.S. Cl. ...................... 106/705; 106/712
(58) Field of Classification Search ............... 106/705, 106/712
See application file for complete search history.

(56) References Cited

U.S. PATENT DOCUMENTS

| | | | |
|---|---|---|---|
| 3,876,411 A * | 4/1975 | Fowler | 71/11 |
| 3,948,830 A * | 4/1976 | Donnelly et al. | 523/401 |
| 4,310,446 A | 1/1982 | Gaus et al. | |
| 5,151,456 A | 9/1992 | Elias et al. | |
| 5,399,048 A * | 3/1995 | Walker, Jr. | 405/129.9 |
| 6,264,740 B1 * | 7/2001 | McNulty, Jr. | 106/817 |
| 6,624,232 B1 | 9/2003 | Wilson, Sr. | |
| 6,652,643 B1 * | 11/2003 | Black | 106/659 |
| 2002/0150429 A1 * | 10/2002 | Hull | 405/129.2 |
| 2002/0177004 A1 | 11/2002 | Terry | |
| 2003/0041782 A1 * | 3/2003 | Malloy et al. | 106/705 |
| 2003/0203995 A1 | 10/2003 | Wilson, Sr. | |
| 2005/0009710 A1 * | 1/2005 | Heathman et al. | 507/203 |

* cited by examiner

*Primary Examiner*—Helene Klemanski
(74) *Attorney, Agent, or Firm*—Jackson Walker, L.L.P.; William B. Nash; Thomas E. Sisson

(57) ABSTRACT

A liquid composition additive for surface coatings such as paint or coal tar asphalt sealant is provided. The additive functions to significantly reduce the amount of time required for the surface coating to dry and thereby allows the coated surface to be quickly returned to service. Preferably, the additive is composed of a composition of fly ash hydrous ammonia, water, and a colorant. This formulation, when added to a liquid surface sealant or coating, will draw water out of the surface coating extremely fast thereby reducing the amount of time required for the surface coating to dry.

2 Claims, No Drawings

LIQUID COMPOSITION ADDITIVE TO REDUCE DRYING TIME OF SURFACE COATINGS

BACKGROUND OF THE INVENTION

The present invention relates to liquid surface sealants, and, more particularly, to pavement or asphalt coating compositions and paints. In some situations, the drying or cure time for a particular coating is critical. For example, concrete or asphalt parking lots must be coated to retard oxidation and protect the surface from harmful automotive fluids. However, closing a lot creates considerable problems for the business customers and owners. Customers who must park at a distance from the business are inconvenienced and this adversely affects sales.

Currently, the minimum industry cure time for a parking lot coating is 24–48 hours. Further, a location may be subsequently closed to apply painted stripes to the coated surface. This causes additional customer inconvenience.

The present inventive surface sealant or paint allows traffic to be reintroduced to a parking lot within 2–4 hours of the final application coat. The faster cure time of the present invention allows for striping to be applied within an hour or two of the final coat thereby eliminating not only a second customer inconvenience, but eliminating a second trip by the application contractor to the job site. As may be easily seen, the reduced cure and drying times of the present invention allows the contractor to complete more jobs per unit of time, generate greater revenues with fewer labor costs, and provide greater customer satisfaction.

The present invention provides a longer lasting coating film which does not bleed into or smudge onto the painted stripes. Additionally, the present invention may be used with a traffic paint for stripes depending upon the colorant added and petroleum base liquid used in mixing the sealant. The same advantages noted in the use of the present invention as a parking lot sealant result when used as a stripe or traffic paint, i.e., quicker cure and drying times in humid conditions resulting in greater profits and added convenience to the public.

SUMMARY OF THE INVENTION

A surface sealant having a fast cure time is provided by a mixture of a petroleum based liquid such as a bituminous composition or paint with a curing additive having a pozzolanic powder such as fly ash, gypsum, Portland cement, lime or calcium carbonates and an ammonium dispersing composition, such as hydrous ammonia, ammonium chloride, and ammonium sulfate. Water is utilized to assist in mixing the separate components. Various colorants or pigments may be further added to provide the appropriate coloration for the sealant or paint.

DESCRIPTION OF THE PREFERRED EMBODIMENT

The present inventive surface sealant or paint additive may be packaged in 3.5 gallon containers for ultimate addition to 100 gallons of base coating liquid. Such base coating liquids may be selected from a number of petroleum based compositions including coal tar seal coat (having approximately 30% by weight refined coal tar and approximately 30% by weight ball clay) or asphalt resin seal coat (having approximately 30% by weight asphalt resin, 25% by weight ball clay, and approximately 10% by weight ground silica).

The sealant additive is formulated by mixing 1–15 pounds of a pozzonlanic powder such as fly ash with one to three gallons of water and one to five ounces of an ammonium additive such as hydrous ammonia. Sixty-four ounces of a black colorant or pigment may be added to color the sealant additive.

These components may be mixed prior to arrival at the job site or mixed at the job site for application to the traffic surface. The fly ash may be replaced with Portland cement, gypsum, lime, or other pozzonlanic cementitious composition. The quantity of the pozzonlanic material may vary depending upon the drying or cure time desired.

The preferred range for fly ash is 5–10 pounds, most preferably 7 pounds, in approximately two gallons of water with four ounces of ammonium additive. The cure time required after application until traffic may be reestablished on the surface is reduced from approximately 24 hours to approximately 2.5 hours; an approximate 10-fold reduction.

As noted, coloring pigment may be added to the composition. For example, black powder pigment (such as carbon black) may be added to the composition to provide a black sealant for use on asphalt surfaces. Also, liquid black pigment may also be added to the composition to provide a black sealant. Iron oxide may be added to give the sealant a red coloring. Titanium dioxide may be used as a white coloring agent. Other colorants may be added as desired.

When the present inventive additive is mixed with a standard striping paint, the amount of ammonium additive may be decreased and even eliminated if the particular paint has an ammonium component.

While this invention has been described as having a preferred design and use, it is understood that it is capable of further modifications, uses and/or adaptations following in general the principle of the invention and including such departures from the present disclosure as come within the known or customary practice in the art to which the invention pertains and as maybe applied to the central features hereinbefore set forth, and fall within the scope of the invention and the limits of the appended claims. In particular, although the composition is described as composed of certain quantities of the stated ingredients, it should be understood that a vast range of quantity is permissible and will still yield the desired results.

The invention claimed is:

1. An additive for reducing the cure time of a petroleum-based surface sealant comprising:
   a mixture of 5 to 10 pounds of non-aqueous fly ash, one to five ounces of hydrous ammonia, and one to three gallons of water, said mixture sufficient to effectively reduce said cure time of approximately 100 gallons of said sealant.

2. An additive for reducing the cure time of a coal tar or asphalt resin sealant comprising:
   a mixture of approximately 7 pounds of non-aqueous fly ash, approximately three ounces of hydrous ammonia, and two gallons of water, said mixture sufficient to effectively reduce said cure time of approximately 100 gallons of said sealant.

* * * * *